United States Patent [19]
Ahlström et al.

[11] Patent Number: 6,154,645
[45] Date of Patent: Nov. 28, 2000

[54] METHOD AND APPARATUS FOR USING A MS TONE TO PREVENT A VOICE ANNOUNCEMENT IN A GROUP CALL

[75] Inventors: Lars Gunnar Folke Ahlström, Västra Frölunda; Jan Peter Ramle, Mölnlycke, both of Sweden

[73] Assignee: Telefonaktiebolaget L M Ericsson (publ), Stockholm, Sweden

[21] Appl. No.: 09/330,468

[22] Filed: Jun. 10, 1999

[51] Int. Cl.[7] .................................................. H04M 3/42
[52] U.S. Cl. .......................... 455/414; 455/416; 455/518; 455/519; 455/417; 455/413
[58] Field of Search .................................. 455/413, 414, 455/417, 415, 560, 412, 428, 464, 416, 518, 519

[56] References Cited

U.S. PATENT DOCUMENTS

| | | | |
|---|---|---|---|
| 3,872,261 | 3/1975 | Shinoi et al. | 179/99 |
| 4,682,367 | 7/1987 | Childress et al. | 455/17 |
| 5,249,230 | 9/1993 | Mihm et al. | 340/23 |
| 5,363,426 | 11/1994 | Nyhart | 379/57 |
| 5,465,391 | 11/1995 | Töyrylä et al. | 455/33.4 |
| 5,711,011 | 1/1998 | Urs et al. | 455/520 |
| 5,752,191 | 5/1998 | Fuller et al. | 455/445 |
| 5,797,100 | 8/1998 | Dettner | 455/518 |
| 5,809,018 | 9/1998 | Lehmusto | 370/330 |
| 5,848,142 | 12/1998 | Yaker | 379/215 |
| 5,924,041 | 7/1999 | Alperovich et al. | 455/456 |
| 5,930,723 | 7/1999 | Heiskari et al. | 455/518 |
| 5,953,400 | 9/1999 | Rosenthal et al. | 379/202 |
| 5,953,673 | 9/1999 | Neubauer et al. | 455/518 |
| 5,970,417 | 10/1999 | Toyryla et al. | 455/519 |
| 6,032,051 | 10/1999 | Hall et al. | 455/518 |

FOREIGN PATENT DOCUMENTS

| | | |
|---|---|---|
| 19620035 | 11/1997 | Germany . |
| 10108265 | 4/1998 | Japan . |
| 2296409 | 6/1996 | United Kingdom . |
| WO 94/28687 | 12/1994 | WIPO . |
| WO 97/01252 | 1/1997 | WIPO . |
| WO 98/09423 | 3/1998 | WIPO . |
| WO 98/09425 | 3/1998 | WIPO . |

OTHER PUBLICATIONS

EPO Standard Search Report for RS 103323US dated Feb. 16, 2000.

Primary Examiner—Fan Tsang
Assistant Examiner—Marceau Milord
Attorney, Agent, or Firm—Jenkens & Gilchrist, P.C.

[57] ABSTRACT

A technique for preventing voice announcements in a group call is provided. A mobile station is configured to generate an MS tone in response to receiving an individual call from a group controller. The MS tone identifies to the group controller that the mobile station has been reached. Upon receiving and detecting the MS tone, the group controller adds the mobile station to the group call. This approach guarantees that no voice announcements will be added to the group call. With this approach, all subscribers are allowed to use voice mail systems, but the subscribers currently forwarding messages to voice mail will not be connected to group calls.

24 Claims, 5 Drawing Sheets

METHOD AND APPARATUS FOR USING A MS TONE TO PREVENT A VOICE ANNOUNCEMENT IN A GROUP CALL

CROSS-REFERENCE TO RELATED APPLICATIONS

This Application relates to the applications entitled:
METHOD AND APPARATUS FOR USING A B-ANSWER SIGNAL TO PREVENT A VOICE ANNOUNCEMENT IN A GROUP CALL and
METHOD AND APPARATUS FOR USING A VM TONE TO PREVENT A VOICE ANNOUNCEMENT IN A GROUP CALL.

These applications are being filed simultaneously herewith in the U.S. Patent & Trademark Office.

FIELD OF THE INVENTION

The present invention relates generally to mobile networks and, more particularly, to a technique which supports group calls in mobile networks.

BACKGROUND OF THE INVENTION

One important service provided by a group server connected to a Public Land Mobile Network (PLMN) is that of automatically establishing group calls. A group call is a conference call in which all participants can in turn talk and listen to each other, or, alternately, a broadcast call in which all the participants simultaneously receive a transmitted message. Another important service which is starting to be provided in PLMNs is that of voice mail. This service allows a mobile subscriber to, instead of immediately receiving a telephone call from a calling party, forward the call to a voice mail system which will then offer the calling party an opportunity to leave a voice mail message, which is then stored and later retrieved by the mobile subscriber. A problem may develop in the interaction of these two services, in that, during the process of setting up a group call, one of the mobile stations may have the call forward feature set so that all of its calls are forwarded to a voice mail system. In this case, a connection for the call will be made to the voice mail system which will then produce a voice mail announcement. Thus, a connection will not be established to the intended mobile station, and if nothing is done further to correct this unintended action, the automated group controller will connect the voice mail system to the group call.

In the related art, there are several solutions which have been proposed to solve this problem. Each of the solutions has corresponding disadvantages. One proposed solution is to permanently switch off the call forward service for all subscribers that may be part of a group call. However, this would preclude these subscribers from using the call forward feature. Since the call forward feature is a standard feature in PLMNs, this is not a desirable solution.

Another proposed solution is to provide a mobile subscriber with dual subscriptions, i.e. a subscription exclusively dedicated to group calls and a regular subscription for all other calls. The group call subscription would have call forward service permanently disabled. The regular subscription would allow the call forward service. Although dual subscriptions appears to be a good solution, this solution may cause conflict with fraud detection systems in the network since the mobile equipment can change subscriptions very quickly.

In yet another proposed solution, it is possible for the automated group controller to switch off the call forward service for the terminating parties, i.e. the parties to be added to the group call. In this approach, the automated group controller accesses the home location register (HLR) to determine if the called party is detached or otherwise unreachable. The automated group controller may then switch off the call forward service of the called party. However, there are problems with this approach. First, an interface will have to be developed exclusively to enable this interaction between the automated group controller and the HLR. Then there is the security problem of providing HLR information to the automated group controller. There is also a problem if someone else calls the terminating party after the call forward service has been switched off. There is also a problem if the automated group controller fails to reset the changes in the HLR. Additional problems result in handling additional call forward services, such as call forward on no reply and call forward on busy.

In yet another proposed solution, the automated group controller detects a backward notification of the call forward service and only adds those parties that have not enabled the call forward feature. Backward notification only works for an automated group controller using the Integrated Services Digital Network User Part (ISUP) of some versions of the Global Systems For Mobile Communications (GSM). In these versions of GSM, a backward notification signal is sent to the automated group controller indicating that a call forward service is in progress, e.g., Advance Mobile Phone Service (AMPS) networks do not support backward notification of a call forward service.

In view of the foregoing, it would be desirable to provide one or more techniques which overcomes the above-described inadequacies and shortcomings of the above-described proposed solutions.

SUMMARY OF THE INVENTION

According to the present invention, a technique for using a MS tone to prevent a voice announcement in a group call is provided. The group call may be initiated by an originator sending a group call number over a telecommunications network to a group controller. Preferably, the telecommunications network includes one or more Public Land Mobile Networks and may include a Public Switched Telephone Network.

In one aspect of the present invention, the group call involves a plurality of potential participants of the group call. Each of the plurality of potential participants of the group call receives an individual call from the group controller. A first potential participant of the plurality of participants is a mobile station configured to generate an MS tone for identifying that the terminating party is a mobile station. The MS tone is generated by the first potential participant in response to the received individual call. The MS tone is detected, preferably by a MS tone detector associated with the group controller. The first potential participant is added to the group call upon detection of the MS tone.

In another aspect of the present invention, a second potential participant of the plurality of potential participants is excluded from the group call. The second potential participant forwards its individual call to a voice response system. The voice response system may be a mail system or a network response system.

In still another aspect of the present invention, a second potential participant of the plurality of potential participants is excluded from the group call. The second potential participant forwards its individual call to a telephone system which is not configured to generate an MS tone. The telephone system may be a fixed system of a Public Switched Telephone System or a mobile system of a Public Land Mobile Network.

In yet another aspect of the present invention, a group mobile station, associated with one of the potential participants and coupled to the network, is configured to generate an MS tone upon being signaled over the network. The MS tone identifies that a mobile station has been reached. A group controller, also coupled to the network, is configured to detect the MS tone. Upon detection of the MS tone, the group controller connects the mobile station to the group call.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
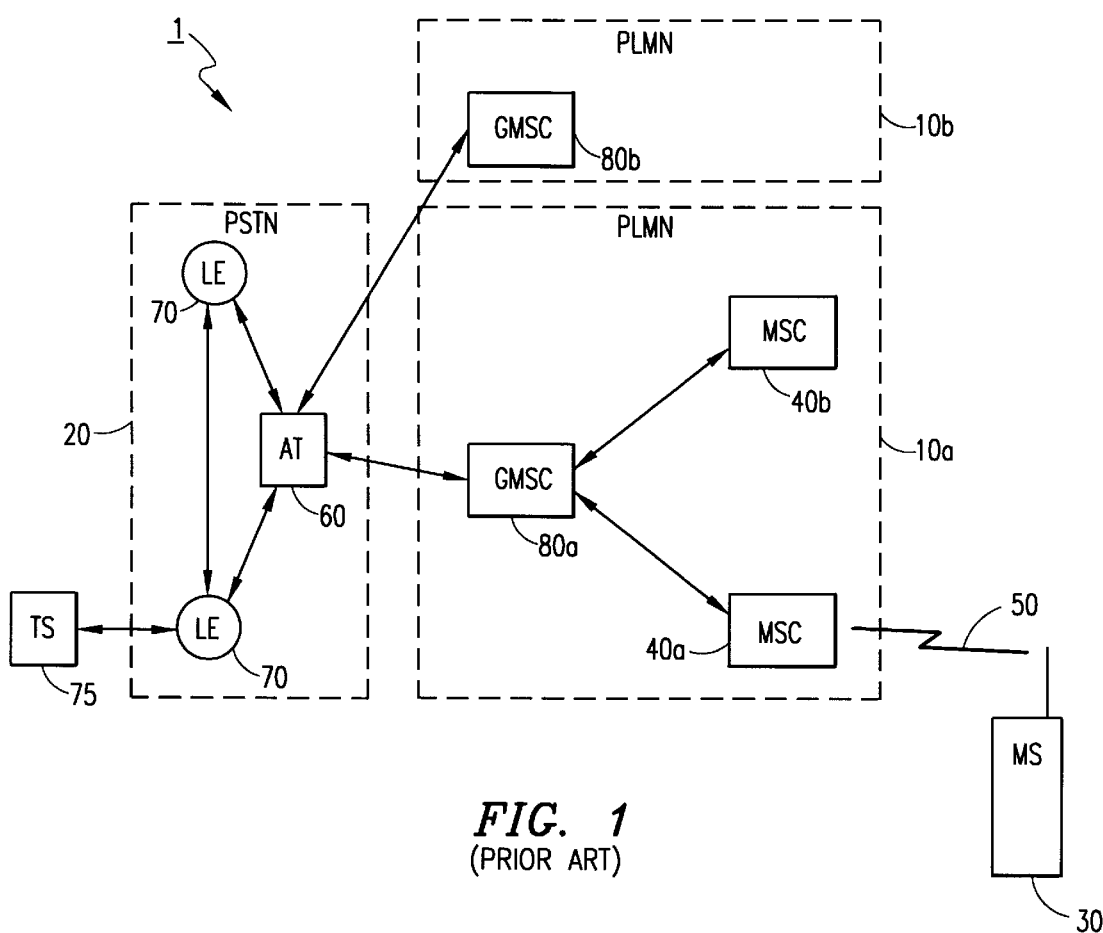
FIG. 1 is a block diagram illustrating the network connection of multiple Public Land Mobile Networks (PLMNs) to a Public Switched Telephone Network (PSTN) in accordance with the present invention.

Referring to FIG. 1, there is shown a block diagram illustrating a telecommunications network 1 having multiple Public Land Mobile Networks (PLMNs) 10 interconnected to a Public Switched Telephone Network (PSTN) 20. A mobile station (MS) 30 is associated with one of the PLMNs 10 (i.e., the home PLMN 10a). Within each PLMN 10, there are a number of different mobile switching centers (MSC) 40 servicing the geographical area covered by that PLMN 10. A home location register (HLR, not shown) and a visitor's location register (VLR, not shown) are associated with each MSC 40. The mobile station (MS) 30 is serviced by one of the MSCs 40 (i.e., the servicing MSC 40a). The servicing MSC 40a establishes call connections over a radio link 50 with the mobile station (MS) 30. Within each PLMN 10, there exists a Gateway Mobile Switching Center (GMSC) 80 for routing incoming calls intended for a mobile station to the appropriate MSC 40. The PLMNs 10 establish call connections with telephone subscribers of the PSTN 20 via the GMSCs 80. Thus, a mobile phone subscriber at mobile station (MS) 30 is capable of communicating through the network 1 with a telephone subscriber of the PSTN 20 at a telephone station (TS) 75 associated with the PSTN 20. As an illustration, a call to the MS 30 initiated at the TS 75 is routed to one of the local exchanges (LE) 70 of the PSTN 20, which then routes the call to an access tandem (AT) 60. The access tandem (AT) 60 then routes the call to the GMSC 80a, which then routes the call to the MSC 40a, i.e the mobile switching center servicing the mobile station 30. The MSC 40a then finds the location of the mobile station 30 in its HLR and routes the call to the mobile station 30 over the radio link 50.

Figure 2:
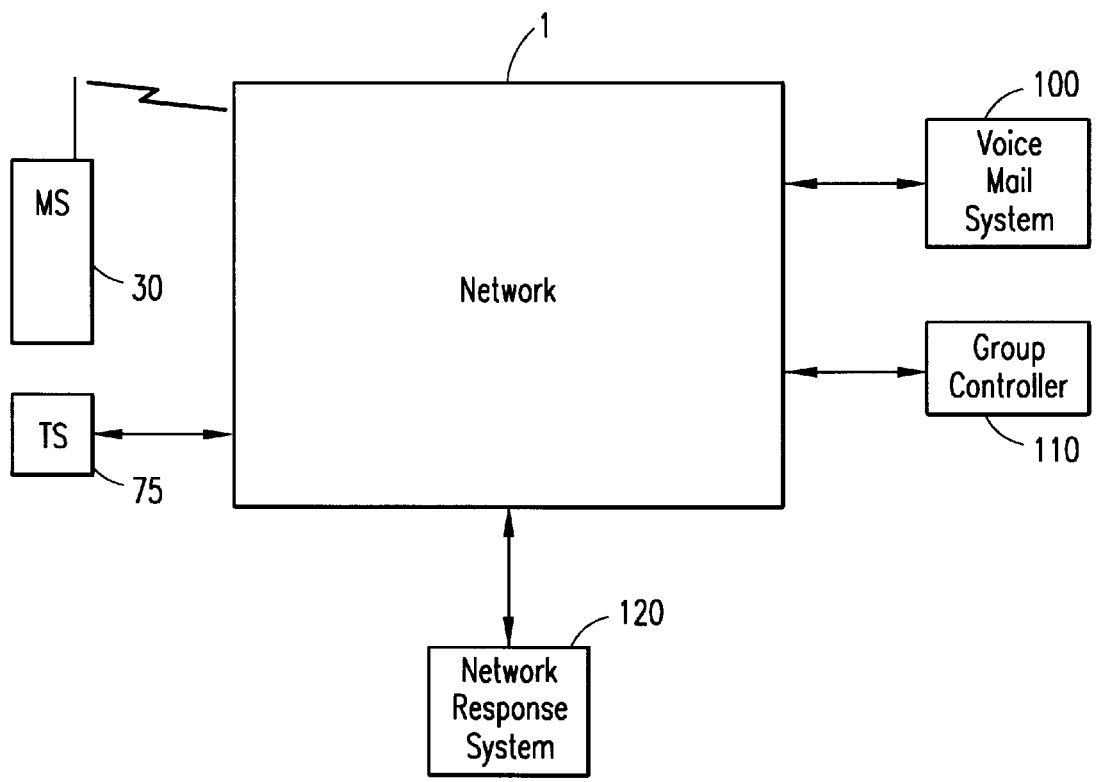
FIG. 2 is a block diagram illustrating the telecommunication network of FIG. 1 being coupled to systems providing services to that network.

FIG. 2 illustrates the telecommunications network 1 coupled to a voice mail system 100, a group controller 110, and a network response system 120. These systems may communicate with each other and network subscribers (e.g., MS 30 and TS 75) over the communication paths of the network 1.

The group controller 110 is responsible for setting up and then monitoring ongoing group calls for the network 1. The group controller 110 is preferably associated with an MSC 40. However, the group controller 110 generally may be connected to any location of network 1 using the available communication paths of network 1. The group controller 110 may be an independent server, or alternately, a group of distributed servers, or a computer system.

The voice mail system 100 is configured to record, store, and retrieve messages forwarded from the mobile stations, e.g., mobile station 30, of one or more Public Land Mobile Networks 10 of network 1. Typically, the voice mail system 100 is shared by several MSCs in a PLMN.

The network response system 120 is configured to respond to a failed call setup, e.g., a called party is unreachable, placed to mobile stations associated with a PLMN 10. For example, a call placed through the network 1 may not be able to reach a mobile station that has suddenly dropped out due to lack of radio coverage. In this situation, the network response system 120 transmits a message to the calling party explaining that a call connection cannot be made.

Figure 3:
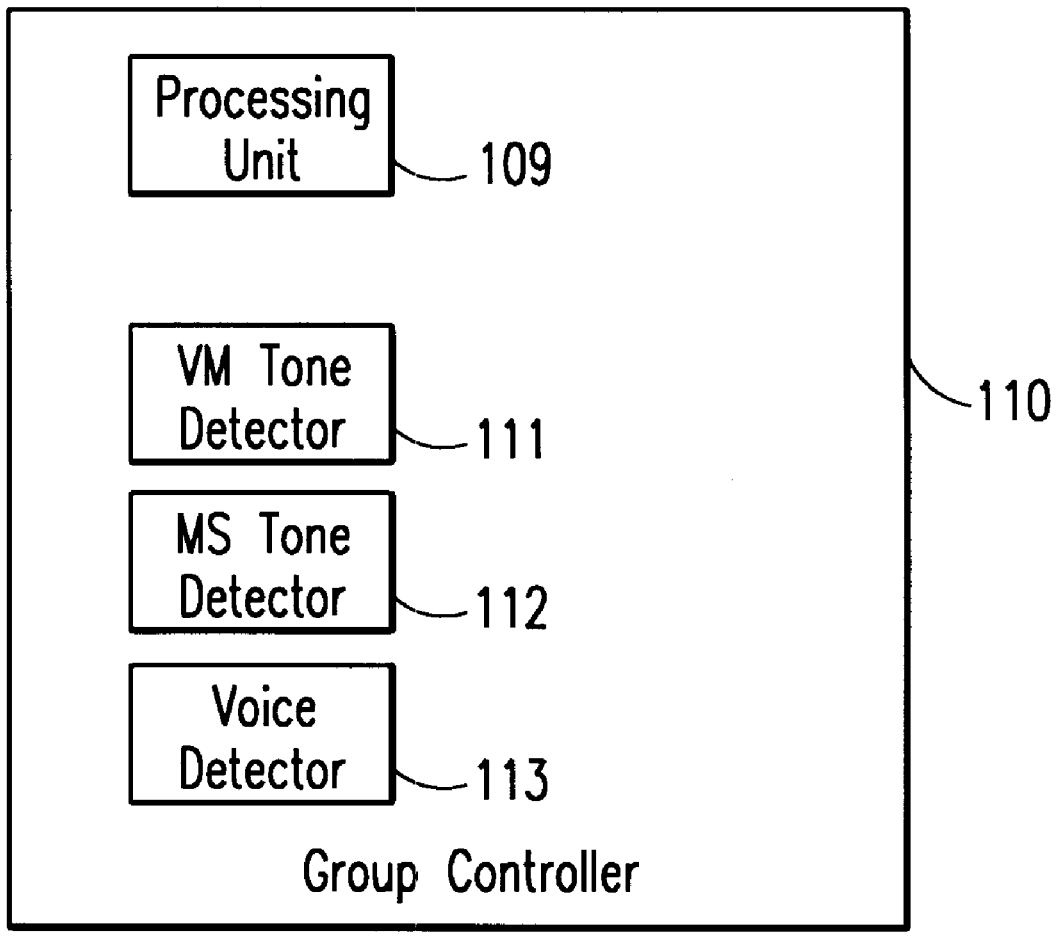
FIG. 3 is a block diagram illustrating a group controller of group calls according to the present invention.

FIG. 3 illustrates an embodiment of the group controller 110 according to the present invention. The group controller 110 includes a processing unit 109 configured to perform the tasks of setting up and managing one or more group calls. The group controller 110 also includes a voice mail (VM) tone detector 111, a mobile station (MS) tone detector 112, and a voice detector 113, each for detecting signals of incoming calls. The method and apparatus of the present invention specifically employs the MS tone detector 112. The VM tone detector 111 is employed in the previously referenced related application entitled "Method and Apparatus For Using A VM Tone To Prevent A Voice Announcement In A Group Call" and the voice detector 113 is employed in the previously referenced related application entitled "Method and Apparatus For Using A B-Answer Signal To Prevent A Voice Announcement In A Group Call".

Figure 4:
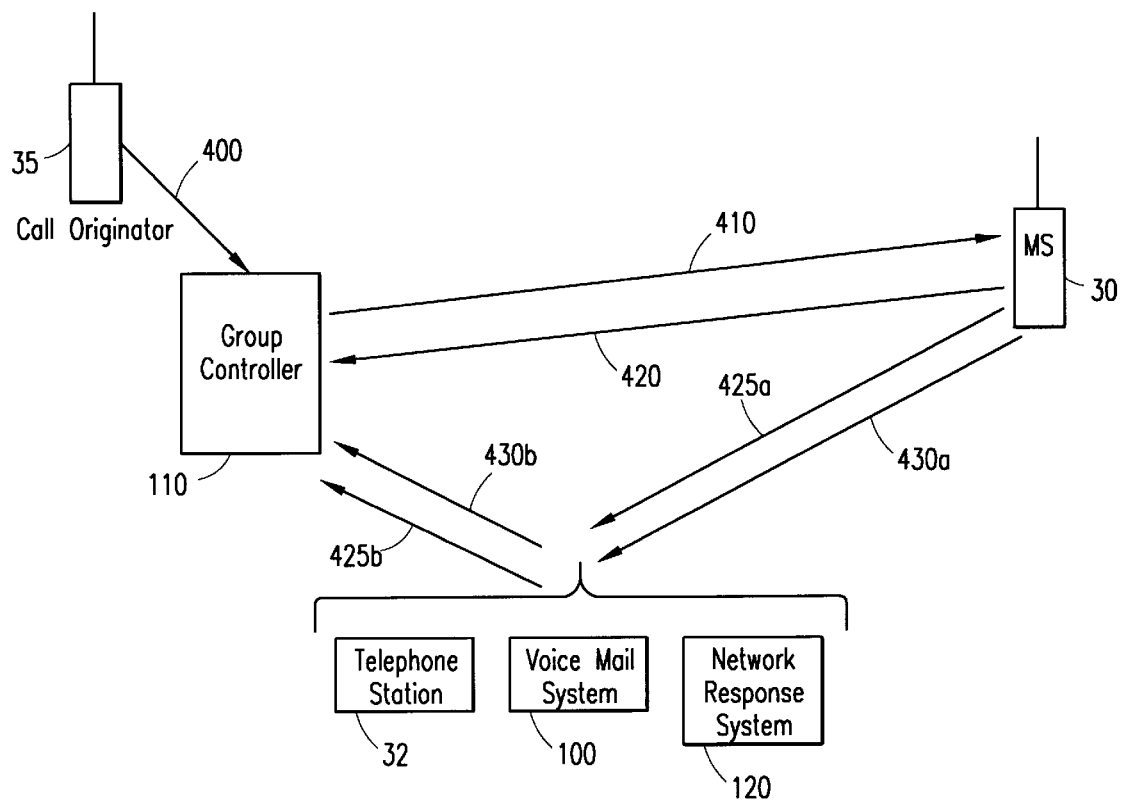
FIG. 4 is a block diagram illustrating the sequence of events involved in setting up a group call using a mobile station (MS) tone so as to prevent voice announcements according to the present invention.
Figure 5:
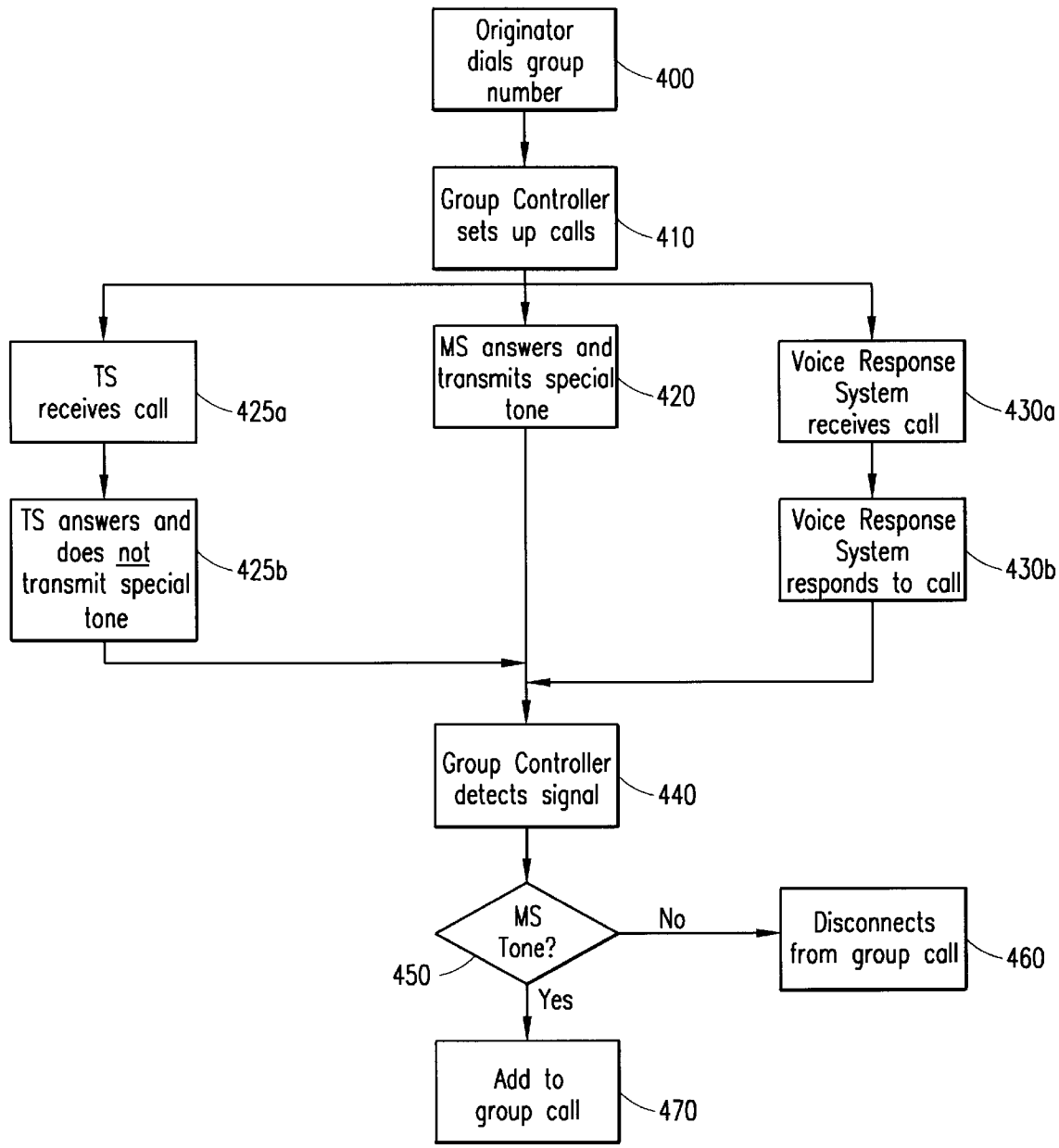
FIG. 5 is a logic diagram illustrating a technique of using a MS tone to prevent voice announcements that a group controller may incorporate to implement the present invention.

The present invention can best be understood with reference to FIGS. 4–5. FIG. 4 illustrates the various components involved in preventing voice announcements in a group call using an MS tone according to the present invention. The various components include a call originator 35 for initiating a request for a group call by supplying a group call number, a mobile station 30 exemplary of the participants in the group call, a voice mail system 100, a network response system 120, a group controller 110, and a telephone station (TS) 32 exemplary of a telephone station (either fixed or mobile) receiving a forwarded call. FIG. 4 also illustrates, in conjunction with FIG. 5, the sequence of events involved in setting up a group call using a mobile station (MS) tone to prevent voice mail announcements according to the present invention.

FIG. 5 is a logic diagram illustrating the steps involved in preventing voice mail announcements in a group call using an MS tone according to the present invention. At step 400, the originator 35 of the group call, which may be a fixed station coupled to the PSTN 20 or a mobile station coupled to one of the PLMNs 10, initiates a group call by dialing a group number which is identified by the network 1 (typically at an MSC) and passed on to the group controller 110. At step 410, the group controller 110 attempts to establish a connection through the network 1 with every subscriber in the list of subscribers associated with the group call (including the call originator 35) by making an individual call to each of the subscribers in the list of subscribers with the group call. For example, group controller 110 attempts to establish a connection with the mobile station 30 by making an individual call to the mobile station 30 (in step 410). In the case where one of the subscribers answers its individual call (i.e., the mobile station 30), a connection established with that subscriber and the mobile station 30 transmits an MS tone which indicates that a connection has been made to the mobile station 30 (in step 420). That is, the mobile station 30, being a mobile station designed to handle group calls (a group mobile station), is configured to answer its individual call by generating the MS tone upon receiving its individual call. In the case where one of the subscribers does not answer its individual call (i.e., when the call is not answered by the mobile station 30), the individual call is forwarded (provided the subscriber has the supplementary Call Forward service) to either the voice mail system 100 (in step 430*a*), to the network response system 120 (in step 430*a*), or to another telephone station (TS) 32 (in step 425*a*). In the case where the individual call is forwarded to either the voice mail system 100 or the network response system 120, that system will then answer the call (in step 430*b*). If the call is forwarded to the telephone station 32, then the telephone station 32 will answer the call (in step 425*b*). This example illustrates the situation when the telephone station 32 is not a group telephone station and thus the telephone system 32 is not configured to generate an MS tone. The telephone station 32 may be a fixed station of a Public Switched Telephone Network or a mobile station of a Public Land Mobile Network.

The group controller 110 and associated processing unit 109 implement steps 440, 450, 460 and 470. In step 440, the mobile station (MS) tone detector 112 of the group controller 110 is configured to listen for the MS tone. In step 450, the controller 110 determines whether a connection has been established to the MS 30 (i.e., through step 420) or to the VM system 110 or the network response system 120 (i.e., through steps 430*a, b*) or to the telephone station 32 (i.e., through step 425*a, b*). If the MS tone detector 112 detects an MS tone, then the call is connected to the mobile station 30 and the called party, e.g. mobile station 30, is added to the group call (in step 470). If the MS tone detector 112 does not detect the MS tone (in the case where the call is answered by voice mail system 100 or network response system 120 or TS 32 not configured to generate an MS tone), then the call is excluded from the group call (in step 460). Therefore, according to the present invention described above, the group controller 110 will only add parties to the group call when a MS tone is detected. This solution insures that voice mail announcements will not be added to the group call.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for preventing a voice announcement in a group call, the group call involving a plurality of potential participants of the group call, each of the plurality of potential participants of the group call receiving an individual call from a group controller, a first potential participant of the plurality of participants being a mobile station configured to generate an auditory MS tone for indicating that the mobile station has been reached, the method comprising the steps of:

receiving the auditory MS tone at the group controller, the auditory MS tone generated by the first potential participant in response to the first potential participant answering the received individual call;

detecting the auditory MS tone at the group controller; and adding the first potential participant to the group call in response to detection of the auditory MS tone.

2. The method of claim 1, wherein:

the detecting step is implemented by a detector associated with the group controller, the detector being configured to detect the auditory MS tone.

3. The method of claim 1, wherein:

the step of adding the first potential participant includes connecting the first potential participant to the group call.

4. The method of claim 1, wherein:

the group call is established in a telecommunications network, the telecommunication network including one or more Public Land Mobile Networks.

5. The method of claim 1, wherein:

the group call is established in a telecommunications network, the telecommunication network including a Public Switched Telephone Network.

6. The method of claim 1, further comprising the step of:

excluding a second potential participant of the plurality of potential participants from the group call, the second potential participant having forwarded its individual call to a voice response system.

7. The method of claim 6, wherein:

the voice response system is a voice mail system.

8. The method of claim 6, wherein:

the voice response system is a network response system.

9. The method of claim 1, further comprising the step of:

excluding a second potential participant of the plurality of potential participants from the group call, the second potential participant having forwarded its individual call to a telephone station.

10. The method of claim 9, wherein the telephone station is a fixed station of a Public Switched Telephone Network.

11. The method of claim 9, wherein the telephone station is a mobile station of a Public Land Mobile Network.

12. The method of claim 1, wherein:

the potential participants are subscribers of a Public Land Mobile Network.

13. A method of preventing a voice announcement in a group call, the method comprising the steps of:

establishing the group call by initiating individual calls to a plurality of subscribers associated with the group call;

receiving responses to the individual calls, the responses generated from the plurality of subscribers;

detecting in each of the responses to the individual calls one of a presence and an absence of an audible tone;

adding to the group call each of the plurality of subscribers having a response in which the presence of an audible tone has been detected; and excluding from the group call each of the plurality of subscribers having a response in which the absence of an audible tone has been detected.

14. An apparatus for preventing voice announcements in a group call, the group call involving a plurality of potential participants, the group call being established in a telecommunications network by signaling the plurality of potential participants of the group call, the apparatus comprising:

a group mobile station, associated with one of the potential participants and coupled to the network, configured to generate an audible tone in response to the group mobile station being signaled over the network, the audible tone identifying that a mobile station has been answered by a participant; and a group controller, coupled to the network, configured to detect the audible tone and, in response to detection of the audible tone, connect the group mobile station to the group call.

15. The apparatus of claim 14, wherein:

the group controller comprises a detector for detecting the audible tone.

16. The apparatus of claim 14, wherein:

the group controller is further configured to exclude from the group call a second potential participant of the plurality of potential participants of the group call, the second potential participant not generating a second audible tone in response to the second potential participant being signaled over the network, the second potential participant instead signaling a voice response system.

17. The apparatus of claim 16, wherein:

the voice response system is a voice mail system.

18. The apparatus of claim 16, wherein:

the voice response system is a network response system.

19. The apparatus of claim 14, wherein:

the group controller is further configured to exclude from the group call a second potential participant of the plurality of potential participants of the group call, the second potential participant not generating a second audible tone in response to the second potential participant being signaled over the network, the second potential participant instead signaling a telephone station which answers the group call without generating the second audible tone.

20. The method of claim 19, wherein the telephone station is a fixed station of a Public Switched Telephone Network.

21. The method of claim 19, wherein the telephone station is a mobile station of a Public Land Mobile Network.

22. The apparatus of claim 14, wherein:

the telecommunication network includes one or more Public Land Mobile Networks.

23. The apparatus of claim 14, wherein:

the telecommunication network includes a Public Switched Telephone Network.

24. The apparatus of claim 14, wherein:

the participants are subscribers of a Public Land Mobile Network.

* * * * *